No. 829,182. PATENTED AUG. 21, 1906.
S. L. TAYLOR.
SPRING WHEEL.
APPLICATION FILED JAN. 10, 1906.
2 SHEETS—SHEET 1.
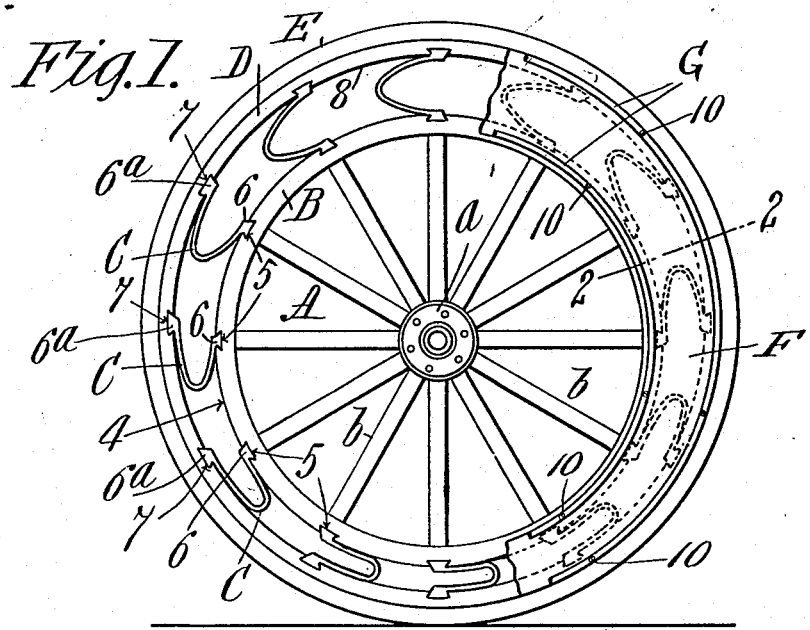
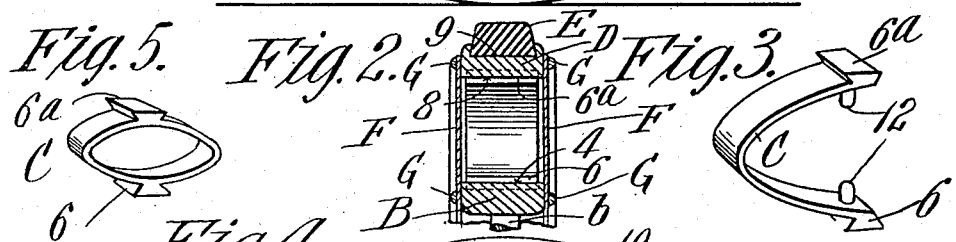
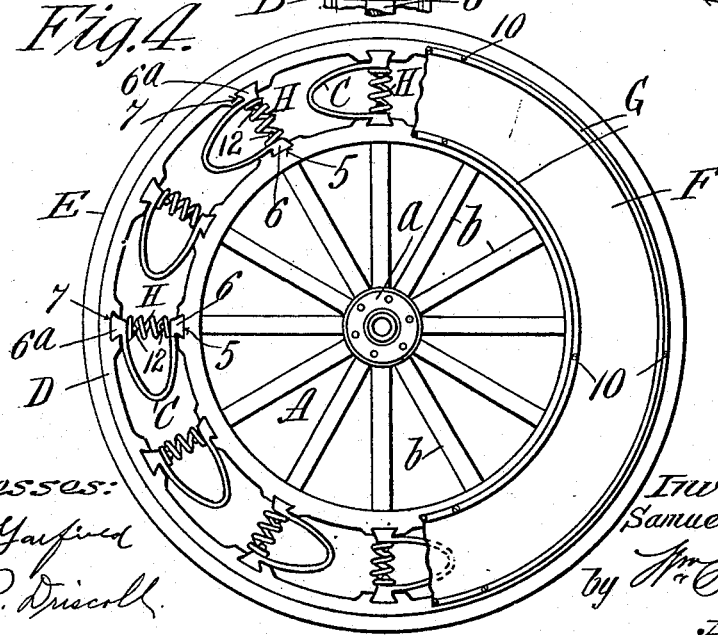
Witnesses:
J. D. Garfield
G. R. Driscoll
Inventor:
Samuel L. Taylor,
by Wm. F. Bellows,
Attorney.

No. 829,182. PATENTED AUG. 21, 1906.
S. L. TAYLOR.
SPRING WHEEL.
APPLICATION FILED JAN. 10, 1906.

2 SHEETS—SHEET 2.

Witnesses:
Inventor:
Samuel L. Taylor
by
Attorney.

UNITED STATES PATENT OFFICE.

SAMUEL L. TAYLOR, OF SPRINGFIELD, MASSACHUSETTS.

SPRING-WHEEL.

No. 829,182.  Specification of Letters Patent.  Patented Aug. 21, 1906.

Application filed January 10, 1906. Serial No. 295,385.

*To all whom it may concern:*

Be it known that I, SAMUEL L. TAYLOR, a citizen of the United States of America, and a resident of Springfield, in the county of Hampden and State of Massachusetts, have invented certain new and useful Improvements in Spring-Wheels, of which the following is a full, clear, and exact description.

This invention relates to spring-wheels for vehicles—such as automobiles, bicycles, and carriages—and has for its object to minimize the vibration between the rim or tire and the hub and to render generally unnecessary the requirement of pneumatic tires on the wheel.

A wheel made in accordance with this invention comprises inner and outer separated annular portions and members of a resilient character which in one sense may be considered spokes for uniting and supporting one of the said annular portions from the other with capability of the parts yielding and absorbing thereby the vibrations developed between the tread and hub, and the wheel, furthermore, includes certain combinations and arrangement of parts and the forms and constructions of the parts, for advantages, all substantially as hereinafter described.

The wheel in various forms is illustrated in the accompanying drawings, in which—

Figure 6:
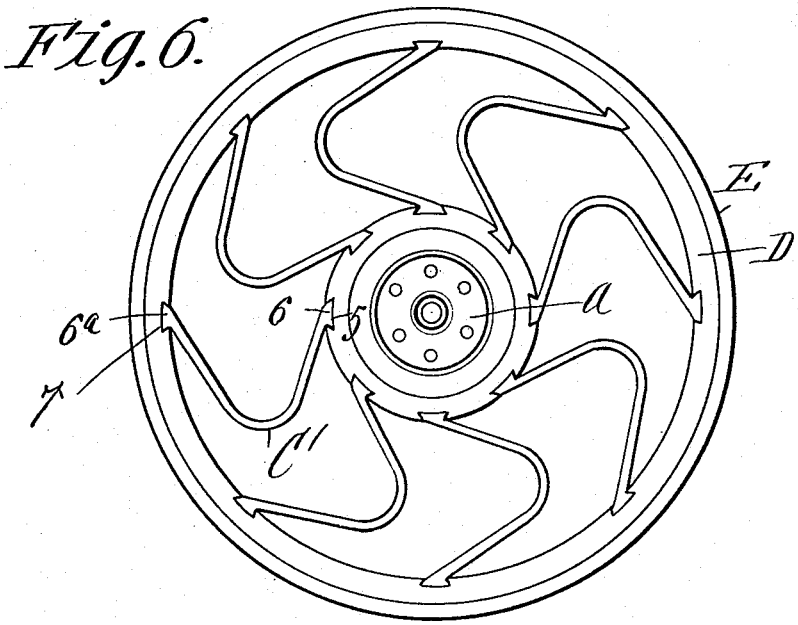
Figure 7:
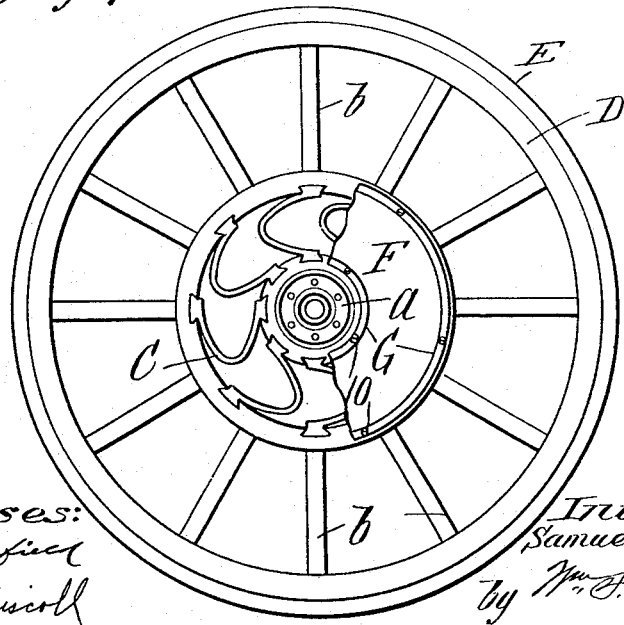

Figure 1 is a side view of the wheel of an approved form of construction. Fig. 2 is a cross-sectional view, on a larger scale, taken on line 2 2, Fig. 2. Fig. 3 is a perspective view in detail of one of the individual springs. Fig. 4 is a side view showing the wheel having compound springs. Fig. 5 is a view of a differently-formed spring which may advantageously be used in this improved wheel. Figs. 6 and 7 are side elevations showing wheels embodying modifications in the constructions and arrangement of some of the parts.

In the drawings, A is a vehicle-wheel comprising a hub $a$, spokes $b$, and a felly or rim B. This felly is preferably of metal and, as shown in cross-section in Fig. 2, is of considerable breadth and has formed on its peripheral surface 4 the dovetail grooves 5. These grooves 5 are located, preferably, at points on the felly opposite the wheel-spokes $b$.

A series of half-elliptical flat springs C, having bevel-edged lugs 6 and $6^a$ formed on their extremities, are secured to the wheel A, as shown in Fig. 1, by the lugs 6 of said springs being engaged with a driving fit into the grooves of the felly B.

An outer wheel-rim D of the same width as the felly B and of a diameter substantially larger than the diameter of the said felly B is secured to the wheel A in a position concentric therewith by the engagement of the lugs $6^a$ of springs C within the dovetail grooves 7, these grooves 7 being formed on the inner face 8 of the said rim D. The outer face of the rim D has formed therein the broad annular groove 9, (see Fig. 2,) which receives the tire E. This tire portion of the wheel may be a solid-rubber tire or for some purposes of use may be of metal or wood.

The annular space formed between the separated surfaces 4 and 8 of the felly B and the rim D is closed in and protected from the entrance thereinto of dust, mud, or water by thin side coverings F, preferably of elastic rubber. These covers F are of ring-like shape and are cemented or otherwise secured by their edges to the sides of the felly B and the rim D and may be further secured thereto by the hoops or bands G, held by pins, screws, or rivets 10, and which hoops or bands, as shown in Fig. 2, are of half-round cross-sectional shape and which effectually cover the cemented edges of the covers F.

In practice a spring-wheel constructed as above described receiving its share of the load of the vehicle initially on the inner wheel A acts to depress such of the springs C between the felly B and rim D as are below the center of the wheel, thereby bringing the wheel A from its normal concentric position within the wheel-rim D to an eccentric position therewithin, as illustrated in Fig. 1.

Simultaneously with the compressing of the springs C on the lower half of the wheel as just described a corresponding distending of the extremities of the springs on the upper portion of the wheel is naturally produced. This action of the springs in the upper part of the wheel is utilized to augment the compressing action of the springs in the lower portion of the wheel and is rendered possible by the secure manner in which the extremities of the springs C individually are attached to the felly B and rim D, respectively, and it will also be perceived that while the springs at the bottom are compressed and the springs at the top are distended the strain on the springs at the side of the wheel is in a manner for draft on the curved length of the endwise-located spring.

the inner extremity of each being pulled down slightly below the level of its outer extremity.

The above-described spring-wheel is capable of resisting great lateral strain thereon such as caused by the vehicle being suddenly turned or swerved from a straight course while traveling at great speed by reason of the great individual strength of each one of the springs C. This strength of the spring-united parts constituting the wheel resides in the wide dimensions of the rim, felly, and uniting springs and in the resultant firm bearing which each of the lug-provided extremities of the springs has in the equally wide dovetail-groove bearings of the rim and felly. Wheels already constructed and in use may be equipped with the outer wider rim and the interposed resilient connection members, and in place of half-elliptic or U-shaped springs full elliptic springs, as shown in Fig. 5, may be employed.

A number of modifications of the above-described spring-wheel are possible.

Fig. 4 shows a simple and practical way of combining the half-elliptical springs c, as described, with spiral springs H. In combining springs C and H in this way, as shown in Figs. 3 and 4, guide and retaining pins or studs 12 are formed on the springs C near their extremities to preserve the said two compounded springs in proper relations to each other.

Other modifications, as shown in Figs. 6 and 7, may be carried out, as, for instance, by employing the hub as the inner annular part or rim and having the springs serve in the place of the usual straight spokes for connecting the hub and the outer rim, Fig. 6, or the hub may be employed as the inner annular part and the rim to which the outer portions of the connecting springs are secured may be made of considerably less diameter than that of the entire wheel, the rim carrying the tire of the wheel being supported from the rim, which is connected to the outer portions of the springs by rigid spokes, Fig. 7.

The springs may be screwed or riveted to the inner and outer annular parts relatively to which they are combined by screws or rivets or fastening means other than the dovetail engagement portions shown.

The outer rim need not be rigid, for a very good character of wheel may be produced by making such rim more or less flexible.

I claim—

A wheel comprising an inner rim and an outer rim in separated relations and having within their proximate faces dovetail recesses and bowed springs having radially outwardly extended dovetail members at their extremities engaged in said recesses and said bowed springs having radially inwardly extended studs at their extremities, and spiral springs arranged with their axes radial to the wheel and in compression between the opposite portions of said bowed springs and having their ends surrounding and in engagement with said studs of the bowed springs.

Signed by me at Springfield, Massachusetts, in presence of two subscribing witnesses.

SAMUEL L. TAYLOR.

Witnesses:
  WM. S. BELLOWS
  G. R. DRISCOLL.